May 1, 1945. L. PRINS Re. 22,640
CLOCK
Original Filed April 30, 1937 3 Sheets-Sheet 1
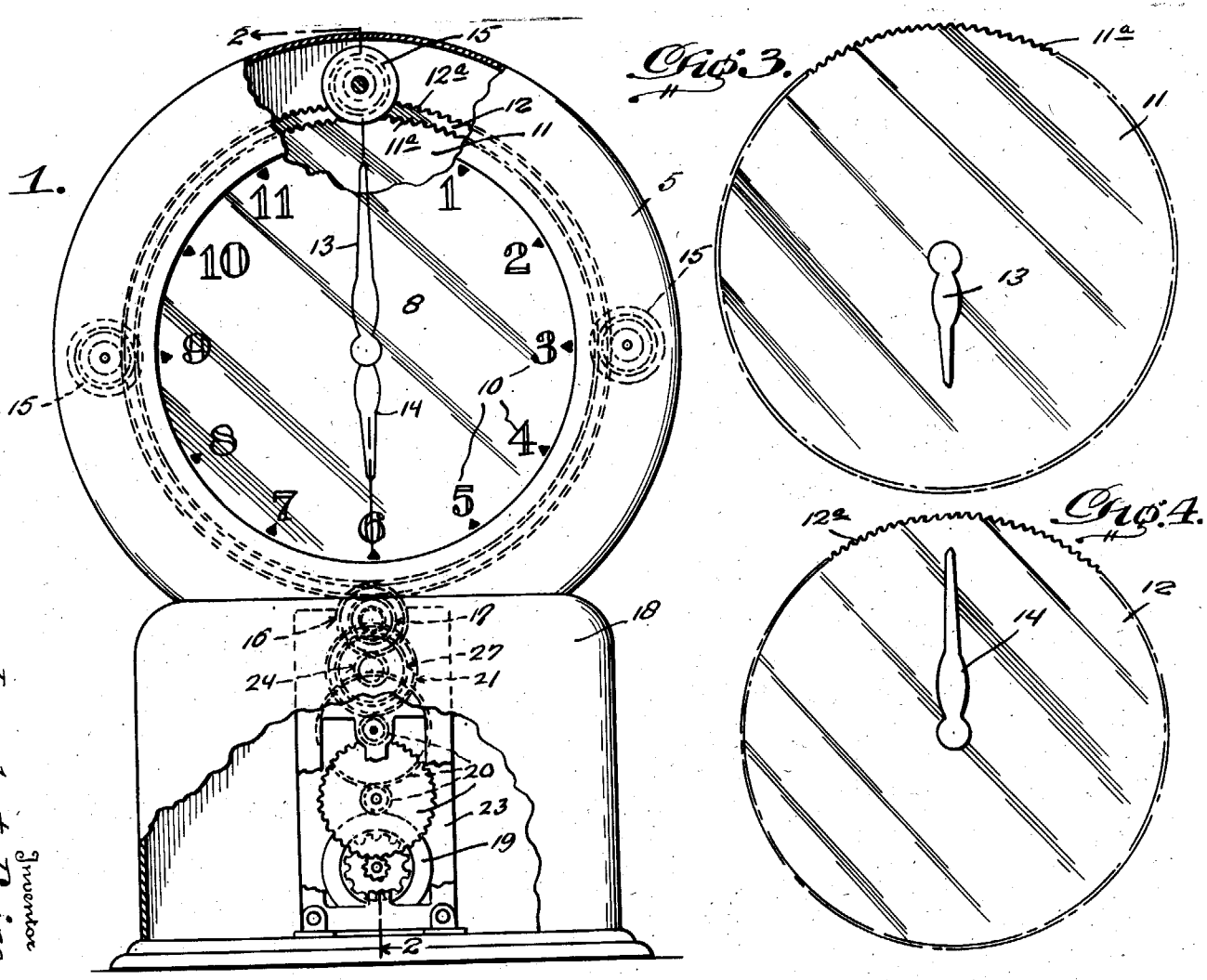
Inventor
Leendert Prins,
By J. Stanley Burch
Attorney May 1, 1945. L. PRINS Re. 22,640
CLOCK
Original Filed April 30, 1937 3 Sheets-Sheet 2
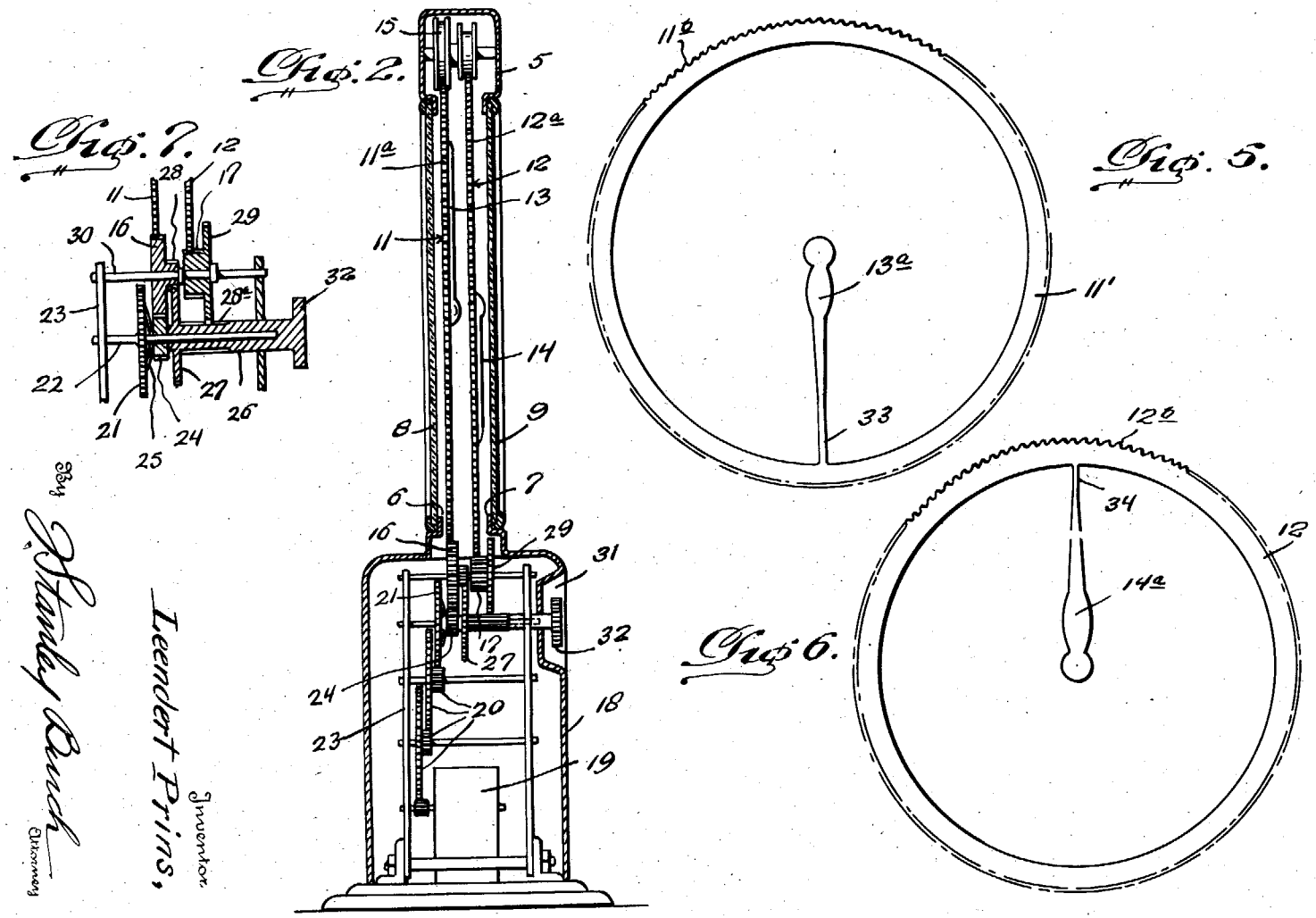
Inventor
Leendert Prins,
By J. Stanley Burch
Attorney May 1, 1945. L. PRINS Re. 22,640

CLOCK

Original Filed April 30, 1937 3 Sheets-Sheet 3

Inventor
Leendert Prins,

By J. Stanley Burch
Attorney

Reissued May 1, 1945 Re. 22,640

UNITED STATES PATENT OFFICE 22,640

CLOCK

Leendert Prins, New York, N. Y.

Original No. 2,248,195, dated July 8, 1941, Serial No. 140,040, April 30, 1937. Application for reissue June 14, 1944, Serial No. 540,233

4 Claims. (Cl. 58—125)

This invention relates to clocks, and the primary object is to provide a clock which embodies extremely simple and efficient means for supporting and driving the hands, which will not readily get out of order, and which may be readily and cheaply manufactured.

A more specific object of the present invention is to provide what may be termed a "magic" clock, the purpose being to create the appearance and optical illusion that the hands of the clock, in moving about the dial, float quite freely, without visible means of support.

In carrying out the above specific object of the present invention, I provide an opaque casing member provided with opposed front and rear openings, transparent members closing the said openings, the transparent member closing the rear opening being provided with a circular series of hour-designating numerals and constituting the dial, circular members respectively having the hour-hand and the minute-hand applied thereto and movable therewith, means located within the casing member and supporting said circular members for rotation within the casing and with their faces between the said openings and transparent members, and means located within the casing operating to rotate said circular members at different speeds so that the hour-hand is caused to traverse the dial once every twelve hours and so that the minute-hand is caused to traverse the dial once every hour, the said casing member masking from view through the front opening and transparent member the means for supporting the circular members, the rotating means and the edges of the circular members, the major central portions of said circular members viewable through the front opening and transparent member also being transparent, and said circular members and the hands carried thereby being devoid of visible support so that the hands appear to float quite freely.

More particularly, an object of the present invention is to provide a clock of the above kind which is extremely simple in construction and so constituted as to effectively carry out the stated purposes of the invention.

Another object of the present invention is to provide a clock of the above kind in which the means for rotatably driving the hands provides for ready manual rotation of said hands for setting the clock.

With the above and other objects in view, the invention consists in the novel form, combination and arrangement of parts hereinafter more fully described, shown in the accompanying drawings and claimed.

In the accompanying drawings, wherein like reference characters indicate similar parts throughout the several views:

Figure 1 is a front elevational view, partly broken away and in section, of a clock constructed in accordance with the present invention.

Figure 2 is a vertical section on line 2—2 of Figure 1.

Figure 3 is an elevational view of the circular member forming part of the clock shown in Figures 1 and 2 which carries the hour-hand.

Figure 4 is a view similar to Figure 3 of the circular member which carries the minute-hand.

Figure 5 is a view similar to Figure 3 of a modified form of the circular member which carries the hour-hand.

Figure 6 is a view similar to Figure 4 of a modified form of circular member which carries the minute-hand.

Figure 7 is a fragmentary sectional view showing part of the means for rotatably driving the circular hand carrying members, and illustrating the means for manually rotating the hand carrying members for setting the clock.

Figure 9:
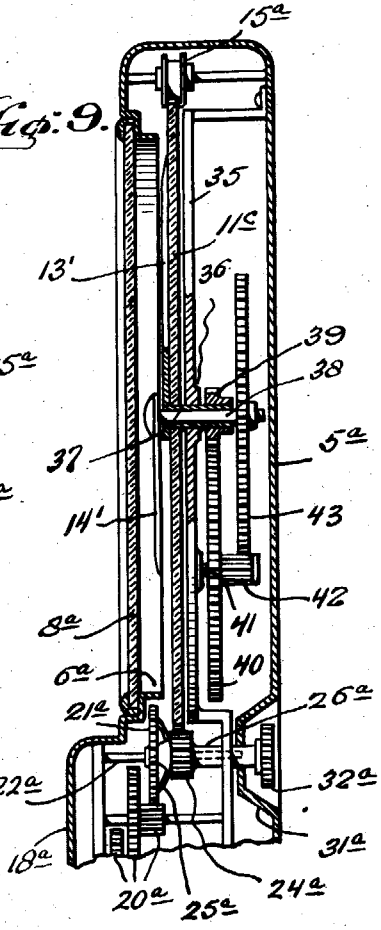
Figure 9 is a section on line 9—9 of Figure 8.

Referring in detail of the drawings, the clock shown in Figures 1 to 4 inclusive includes an opaque casing member 5 provided with opposed front and rear openings 6 and 7 closed by transparent members 8 and 9. The transparent member 9 closing the rear opening 7 is provided with a circular series of hour designating numerals 10 and constitutes the dial of the clock.

Circular transparent members 11 and 12, respectively having the hour-hand 13 and the minute-hand 14 applied thereto and movable therewith, are located within the casing member 5 and supported for rotation within the latter by means of grooved wheels 15 rotatably mounted in the casing member 5 at the top and sides of the latter, and driving gears 16 and 17 mounted in a hollow base 18 upon which the casing member 5 is mounted, the edges of the circular members 11 and 12 engaging in the grooves of the rollers 15 so as to be guided by the latter. The circular members 11 and 12 rest upon the gears 16 and 17 and are formed with peripheral teeth 11*a* and 12*a* respectively meshing with the teeth of the gears 16 and 17. The circular hand carrying members 11 and 12 are located with their faces between the openings 6 and 7 and the transparent members 8 and 9, and means is located in the base 18 of the casing, including the gears 16 and 17, to rotatably drive the circular members 11 and 12 at different speeds so that the hour-hand 13 carried by the member 11 is caused to traverse the dial once every twelve hours, and so that the minute-hand 14 carried by the circular member 12 is caused to traverse the dial once every hour. This driving means may consist of a suitable motor 19, preferably electric, connected by a train of gearing 20 with a driven gear 21 carried by a shaft 22 journaled in the upper portion of a frame 23 arranged within the base member 18 of the casing and supporting the train of gears 20. Rotatably supported on the shaft 22 is a gear 24 meshing with the gear 16 which drives the circular member 11 carrying the hour-hand 13, a driving connection being provided between gears 21 and 24 consisting of a friction clutch 25. Rotatably mounted on the shaft 22 is a tubular shaft 26 carrying a large gear 27 which meshes with a small gear 28 rigid with the gear 16. The tubular shaft 26 is also formed with teeth at 26*a* to provide a small gear meshing with a large gear 29 rigid with the gear 17, the gears 16 and 28 and 17 and 29 being loosely mounted on a supporting shaft 30 mounted at the top of frame 23 where the upper casing member 5 and base member 18 join. The gearing between motor 19 and circular member 11 is such as to drive the latter at such a speed that the hour-hand 13 will traverse the dial once every twelve hours. It will also be seen that the circular member 12 is driven by way of gear 21, gear 24, gear 16, gear 28, gear 27, gear 26*a*, gear 29, and gear 17, so that the minute-hand 14 traverses the dial once every hour. In other words, the circular member 12 is driven so that it rotates twelve times to each complete revolution of member 11. The base 18 may be provided at the back with an inward offset or well 31 within which is disposed a knob 32 secured on the rear projecting end of tubular shaft 26. By turning the knob 32, the circular members 11 and 12 may be rapidly rotated for setting the clock. In performing this operation, the gear 27 will drive the gear 16 through gear 28 while gear 26*a* will drive the gear 17 through gear 29, the gear 24 being rotated on shaft 22 freely relative to gear 21. This turning of gear 24 relative to gear 21, with the latter gear remaining still, is allowed by means of the friction clutch 25 between the gears 24 and 21. As the knob 32 is located at the rear of base 18 and preferably arranged within the well 31, it is not visible to any one observing the clock from the front. Even in the ordinary operation of the clock, the knob 32 will turn so slowly that its rotation may not be readily discerned.

It will be noted that the casing member 5 masks from view through the front opening 6 and transparent member 8 the means 15, 16 and 17 for supporting the circular members 11 and 12, the means for rotatably driving the members 11 and 12 including the gears 16 and 17, and the edges of the circular members 11 and 12. As the major central portions of the circular members 11 and 12 which are viewable through the front opening 6 and transparent member 8 are also transparent, the hands 13 and 14 are devoid of visible support so that they appear to float quite freely. The circular hand carrying members, as shown in Figures 1 to 4 inclusive, preferably consist of glass plates having the hands 13 and 14 etched, painted, or secured thereto in any suitable manner. However, as shown in Figures 5 and 6, these circular hand carrying members may consist of annular members or rings 11' and 12' provided with peripheral gear teeth 11*b* and 12*b*, and having the outer terminals of the hands 13*a* and 14*a* connected thereto as at 33 and 34, respectively. In either case, the major central portions of the circular members which are viewable through the front opening of the casing member 5 are transparent, and said circular members and the hands are apparently devoid of visible support so that the hands appear to float quite freely when the clock is in operation. The construction is extremely simple because there is no transparent plate fitted in the casing between the transparent members 8 and 9 to form the dial, and there is no shaft-like member pivotally mounting the inner terminals of the hands.

Figure 8:
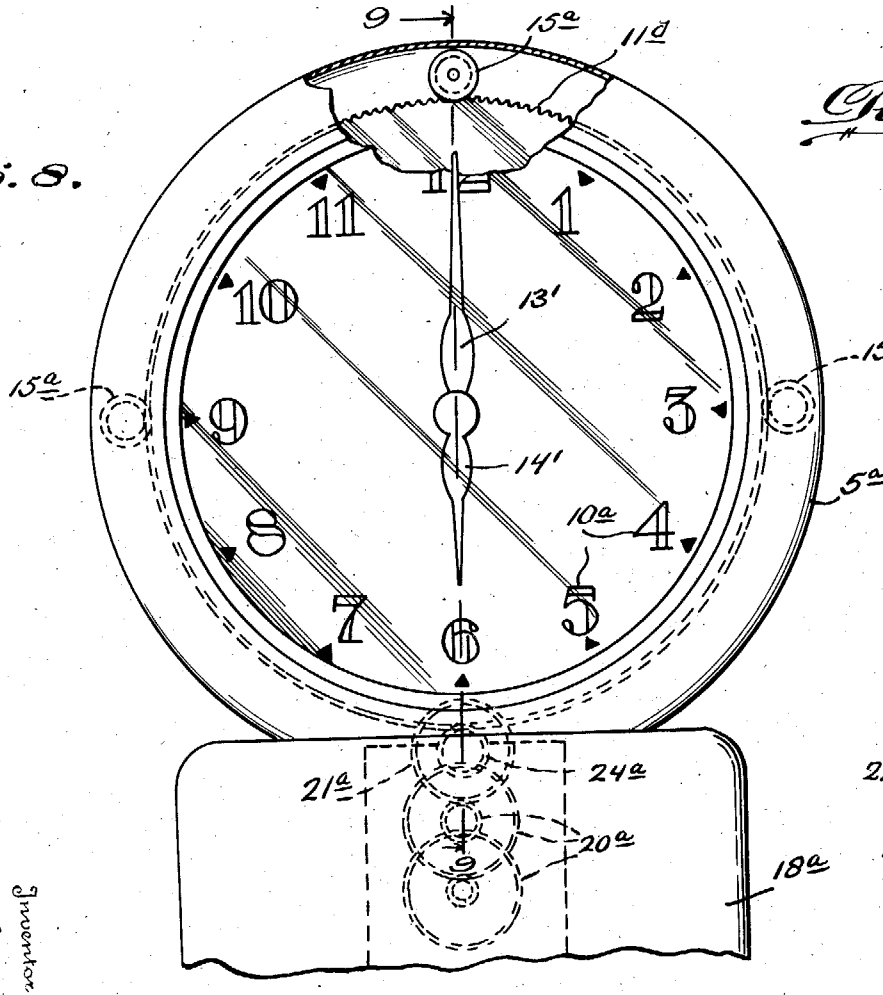
Figure 8 is a view somewhat similar to Figure 1, of a modified form of the present invention.

The embodiment of Figures 8 and 9 includes an opaque casing member 5*a* closed at the back and having a front opening 6*a* closed by a transparent member 8*a*.

Supported in the casing member 5*a* intermediate the back of the latter and the transparent member 8*a* is an opaque plate 35 having a central bearing 36 in which is journaled a tubular shaft 37. Secured on tubular shaft 37 in front of plate 35 is a circular member or disk 11*c* carrying the minute-hand 13' and supported for rotation by means of grooved peripheral guiding wheels 15*a* and a driving gear 24*a* which meshes directly with peripheral teeth 11*d* of said circular member 11*c*. The disk 11*c* may be transparent and the plate 35 provided with a series of hour-designating numerals 10*a* to constitute the dial, or the disk 11*c* may be opaque and the transparent member 8*a* provided with the numerals to constitute the dial. Freely journaled in the tubular shaft 37 is a further shaft 38 having an hour-hand 14' secured on the forward end thereof. Secured on the rear end of shaft 37 is a pinion 39 meshing with a large gear 40 journaled on a shaft 41 carried by plate 35 below shafts 37 and 38. Rigid with gear 40 is a pinion 42 meshing with a large gear 43 secured on the rear end of shaft 38. The disk 11*c* is driven at the proper speed so that the minute-hand 13' is caused to traverse the dial once every hour, and rotation is transmitted from disk 11*c* to shaft 38 so that the hour-hand 14' is caused to traverse the dial once every twelve hours. The driving means may be substantially like that in Figures 1, 2 and 7 and including a driven gear 21*a* connected with a motor through a train of gears 20*a* and carried by shaft 22*a*. The gear 24*a* is carried by a tubular shaft 26*a* rotatably mounted on shaft 22*a*, and is operatively connected with gear 21*a* by a friction clutch 25*a*. The casing has a base 18*a* provided at the back with a well 31*a* within which is disposed a knob 32*a* secured on the rear end of tubular shaft 26*a*. By turning knob 32*a*, the disk 11*c* and hand 14' may be rotated for setting the clock, the gear 21*a* remaining stationary and the gear 24*a* turning relative to gear 21*a* as allowed by clutch 25*a*.

From the foregoing description, it is believed that the construction and operation, as well as the advantages of the present invention will be readily understood and appreciated by those skilled in the art. It will be seen that the clock is extremely simple and compact and is admirably suited to carry out the stated purposes of the invention.

While I have illustrated specific embodiments of my invention, I do not intend to be limited to the details of construction illustrated but intend to claim my invention as broadly as the state of the art and the scope of the appended claims permit.

What I claim as new is:

1. In a clock of the character described, a hollow base having a top opening, a circular opaque casing member rigidly mounted directly on top of said base and provided with opposed front and rear openings, transparent members closing said openings, hour designating numerals on one of said transparent members, rotatable circular members located within said casing member and formed with peripheral gear teeth, the major central portions of said rotatable members being transparent, minute and hour hands rigid with said rotatable circular members, grooved guide wheels mounted within said casing member at the top and sides of the latter and receiving the edges of said rotatable circular members, and means located in said base for driving said rotatable circular members, said driving means including a horizontal shaft mounted within the upper portion of said base and driven spur gears mounted on said horizontal shaft and exposed through the top opening of said base to support said rotatable circular members and mesh with the peripheral teeth of the latter.

2. In a clock of the character described, a hollow opaque base having a top opening, a circular opaque casing member rigidly mounted directly on top of the opaque base and provided with opposed front and rear openings, transparent members closing said openings, time designating indicia on one of said transparent members, rotatable circular members located within said opaque casing member and formed with peripheral gear teeth arranged within said opaque casing member and thereby masked from view, the major central portions of said rotatable members being transparent, a minute hand rigid with one of said rotatable circular members and an hour hand rigid with the other of said rotatable circular members, grooved guide wheels mounted within said opaque casing member at the top and sides of the latter and receiving the edges of said rotatable circular members and means located in said base and masked thereby from view for driving said rotatable circular members, said driving means including a shaft mounted within the upper portion of the base and driven gears mounted on said shaft and extending from the base through the opening and within the opaque casing member to support said circular members and mesh with the peripheral teeth thereon.

3. The clock of claim 2, said hour and minute hands on the transparent major central portions of said rotatable embers and extending thereon toward but not reaching the opaque casing member.

4. In a clock of the character described, a hollow opaque base having a top opening, a circular opaque casing member rigidly mounted directly on top of the opaque base and provided with opposed front and rear openings, transparent members closing said openings, time designating indicia on one of the transparent members, rotatable circular members located within said opaque casing member and formed with peipheral gear teeth arranged within said opaque casing member and thereby masked from view, the major central portions of said rotatable members being transparent, a minute hand rigid with one of said rotatable circular members and an hour hand rigid with the other said rotatable circular members, guide means mounted within said opaque casing member and spaced from each other in the casing member, said guide means receiving the edges of said rotatable circular members and driving means for said rotatable circular members located in said base and masked thereby from view, said driving means including a shaft mounted within the upper portion of the base and driven gears mounted on said shaft and extending from the base through the opening and within the opaque casing member to support said circular members and mesh with the peripheral teeth thereon.

LEENDERT PRINS.